April 18, 1967

R. W. COLLAR ETAL 3,314,447

QUICK CONNECT COUPLING

Filed July 3, 1963

INVENTORS.
ROLLAND W. COLLAR
AUSTIN E. PETTYJOHN
LEONARD P. SPONTELLI
BY Bosworth, Sessions, Herrstrom & Knowles
ATTORNEYS.

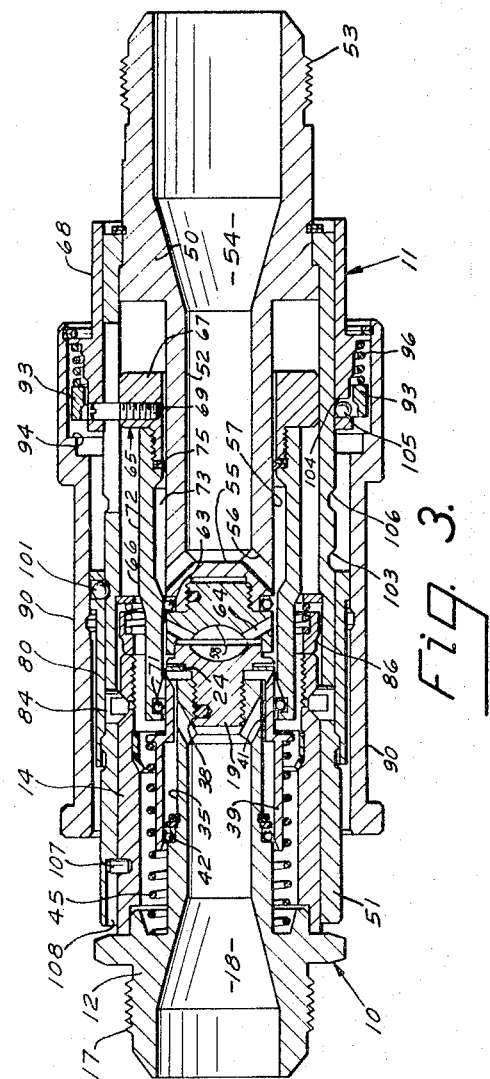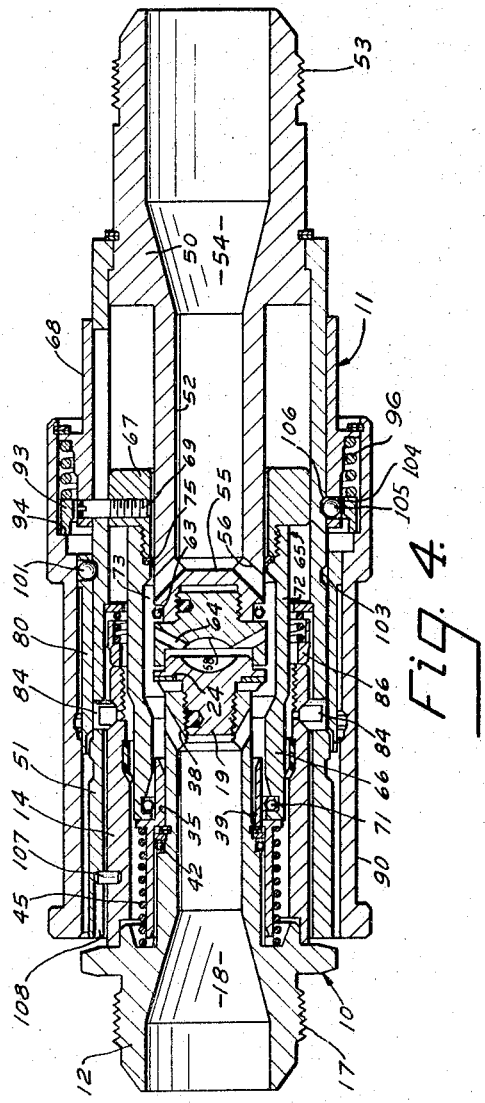

3,314,447
QUICK CONNECT COUPLING
Rolland W. Collar, Sun Valley, Calif., and Austin E. Pettyjohn, Wickliffe, and Leonard P. Spontelli, Cleveland, Ohio, assignors to Lear Siegler, Inc., Los Angeles, Calif., a corporation of Delaware
Filed July 3, 1963, Ser. No. 292,576
5 Claims. (Cl. 137—614.06)

This invention relates to quick connect fluid couplings in which each coupling half is provided with a valve which prevents fluid flow through the coupling half when the coupling is disconnected and permits fluid flow through the coupling halves in a connected condition. In particular, it relates to such a coupling having a balanced fluid seal and balanced valve design.

Broadly, such quick connect couplings have been known and used in the past for connecting and disconnecting fluid lines at zero or very low pressures. Present technology, especially in the aerospace field, requires quick connect couplings which are able to be manually connected and disconnected with high fluid pressure in the lines.

It is an object of our invention to provide a simple coupling for quickly connecting and disconnecting fluid lines under high pressure without using other valving hardware in the lines or otherwise reducing the pressure at one or both of the coupling parts. A further object is to provide such a coupling that can be operated manually. Another object of our invention is to provide such a coupling whose sequence of operation during connection first locks the two coupling parts together, next establishes a fluid seal between them, and finally opens the valves in both coupling parts to establish fluid flow through the coupling; and whose sequence of operation during disconnection is the reverse of its connection sequence. Yet another object is to provide such a coupling whose connection and disconnection sequences of operation are accomplished by simple, straight-forward and opposite unidirectional operating motions. It is also an object of our invention to provide such a coupling having fluid pressure seals which operate in a sequence to effectively prevent any loss of pressure or discharge of fluid from the system with which it is used when the coupling parts are connected or disconnected. A further object is to provide such a quick connect coupling in which the sequencing of the seal transfers during the connecting and disconnecting operation may be accomplish without differential pressure in those cases where differential pressure could cause seal blowout. A further object of our invention is to provide a coupling whose parts are positively locked together at all times in the coupling sequence when the valves in either or both of the coupling parts are open by high efficiency locking means in the form of radially-acting locking pins carried in one of the coupling parts and having relatively large surface areas which positively contact and have locking engagement with surfaces in the other coupling part. Another object of our invention is to provide such a coupling which is simple and lightweight and suitable for application where one or both parts of the coupling are required to be airborne in weight-critical aerospace craft.

The means for accomplishing the foregoing objects as well as other objects and advantages accomplished and provided by our invention will become apparent from the following description and drawings of a preferred embodiment thereof in which.

Figure 1:
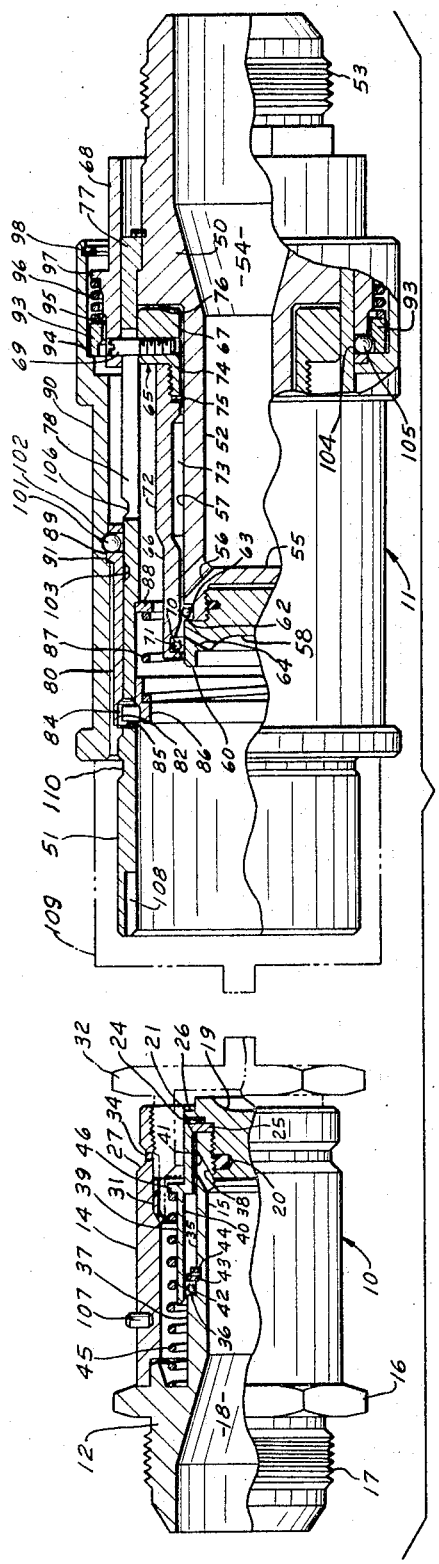
FIGURE 1 is an elevational view of the coupling in disconnected condition and shown in partial axial cross section with the valving means in each of the coupling halves closed against fluid flow.

FIGURE 3 is an axial cross section of the coupling of FIGURE 1 shown at that stage of the coupling or uncoupling sequence at which the coupling halves are locked together and the fluid seal is established between them, but with no fluid flowing through the coupling; and FIGURE 4 is an axial cross section of the coupling of FIGURE 1 shown with the coupling halves locked together and the valve means both open to permit fluid flow through the coupling.

Referring now to the drawings, the coupling consists of a nipple assembly indicated generally at 10 and a socket assembly indicated generally at 11. In referring to these two coupling parts or assemblies and their construction and operation, the two ends of each of them will be designated "front" or "forward" and "rear" or "rearward." The "front" ends are those which are placed together when the coupling is connected and the "rear" ends are those to which fluid conduits may be connected.

Nipple assembly 10 includes a body 12 of generally cylindrical form consisting of an outer cylindrical barrel 14 and an inner and coaxially arranged stem 15 with an annular space between them. The rearward end of barrel 14 and the base of stem 15 are joined together at the rearward portion of body 12. A hexagonal wrench flange 16 and a threaded nipple 17 are provided on the rear portion of that portion of cylindrical body 12 to accomplish its connection to a fluid conduit (not shown).

A fluid passage or bore 18 enters nipple assembly 10 through threaded nipple 17 and extends forwardly through stem 15. Bore 18 is closed at its forward end by an end plug 19 turned into internal threads in the forward end of stem 15 and is sealed by means of a pellet seal 20 carried in end plug 19. An outwardly extending flange 21 having a rear radial shoulder is provided on plug 19 and overlies the annular end face of stem 15. A seal 24, for example laminated Teflon washers, backed by a metal retainer ring 25 is held in place at the end of stem 15 between its forwardly facing annular end face and rearwardly facing shoulder of end plug 19. The forward face of end plug 19 is provided with an annular radial shoulder 26 for cooperation with the socket assembly of the coupling as will be described below.

Cylindrical barrel 14 of nipple body 12 is terminated at its forward end at a point approximately even with plug 19 in stem 15. An external lock pin-receiving groove 27 having a cylindrical bottom wall, and front and rear inclined side walls is provided in cylindrical barrel 14 toward its forward end. Threads and a sleeve seal 31 of Teflon, for example, are provided internally of the forward end of barrel 14 for receiving and sealing the inner end of barrel 14 and nipple assembly 10 with a pressure cap 32 shown in broken outline in FIGURE 1. Pressure cap 32 completely laps all nipple internal seals a and the threaded action permits the application of high sealing loads to the sleeve seal, insuring reliable sealing action. Pressure cap 32 requires the use of a wrench to tighten and loosen it. A pressure bleed opening 34 is provided at circumferentially spaced intervals around cylindrical barrel 14 as in cylindrical bottom wall of lock pin-receiving groove 27 to provide a pressure bleed when the seal is broken on removal to pressure cap 32. By this means, the hazard of a blowout impulse of pressure cap 32 due to entrapped energy within capped nipple assembly 10 is eliminated. The internally threaded forward end portion of barrel 14 and sleeve seal 31 and pressure bleed openings 34 are required only in the event that the nipple is desired to be closed by means such as pressure cap 32.

Stem 15 has a longitudinally extending portion of reduced outside diameter 35 extending from stem seal 24 rearwardly toward a radial shoulder 36 near the base of stem 15, at which point begins a portion of larger outside diameter 37.

A number of fluid passages 38, circumferentially spaced, extend through the wall of stem 15 from bore 18 and open on the outer surface 35 adjacent stem seal 24.

A nipple valving sleeve 39 is mounted for axial sliding motion on stem 15. Sleeve 39 has a stepped bore made up of an enlarged internal bore portion 40 toward its rearward end and an internal bore portion 41 of lesser diameter at its forward end which have mating and sliding engagement with larger diameter portion 37 and lesser diameter portion 35 of stem 15, respectively. A nipple valving sleeve seal 42 is mounted on stem 15 between radial shoulder 36 and a metal ring 43 and snap ring 44 placed about stem 15 a short distance away from radial shoulder 36. Seal member 42, such as an O-ring or the like, sets against bore portion 40 of sleeve 39. A U-shaped FEP Teflon cover over a stainless steel garter-type spring is presently preferred. This seal design permits fluid pressure to act inside the cover and provide a self-engaging feature. The spring causes the seal to exert a positive sealing force against the sealing surfaces even at low pressures. A helical coil spring 45 placed about sleeve 39 acts between body 12 and radially outwardly extending flange 46 on sleeve 39 and urges sleeve 39 toward the forward end of nipple assembly 10. In the forward position as shown in FIGURE 1, sleeve 39 overlies and seals fluid passages 38 in stem 15 by engagement with stem seal 24. When sleeve 39 is retracted as during connection with socket 11 in the manner described below, sleeve 39 is moved against the force of spring 45 and out of engagement with seal 24. Sleeve 39 and its stepped bore portions 40 and 41 are so proportioned with respect to stem 15 that sleeve 39 is in sealing engagement with sleeve seal 42 in all its sliding positions on stem 15.

Socket assembly 11 is of generally cylindrical form and consists of a socket body 50 having an outer cylindrical barrel 51, a socket stem 52 located concentrically of barrel 51 with an annular space therebetween. Barrel 51 and socket stem 52 are joined at the rearward portion of body 50. A threaded nipple 53 is provided at the rear end of socket assembly 11 for its connection to a fluid conduit (not shown). A bore 54 enters socket assembly 11 at its rearward end through threaded nipple 53 and extends forwardly through socket stem 52. The forward end of socket stem 52 and bore 54 therethrough is closed by end wall 55. A plurality of circumferentially spaced fluid passages 56 are provided in the wall of socket stem 52 near its forward end and end wall 55 and extend from socket bore 54 within socket stem 52 to the outer cylindrical surface 57 of socket stem 52.

A socket end plug 58 is turned into the internally threaded circular recess in the forward end of socket stem 52. A radially outwardly extending flange portion 60 on plug 58 overlies the annular end face and cooperates with the annular reduced end of stem 52 to provide an annular groove 62 for a socket stem seal 63. A Teflon cover and steel spring seal, such as preferred for nipple valving sleeve seal 42, is also preferred for seal 63.

A number of circumferential pressure bleed passages 64 are provided in end plug 58 extending from the preferably concave front end face of the plug to its external cylindrical surface 57. Their function will be explained in connection with the operation of the coupling.

The opening and closing of fluid passages 56 in socket stem 52 is accomplished by a socket valving assembly indicated generally at 65 and consisting of balanced pressure socket valving sleeve 66, socket valving sleeve driving ring 67, socket valving sleeve actuator ring 68 and a number of driving pins 69.

Balanced pressure socket sleeve 66 and driving ring 67 are mounted together on socket stem 52 for sliding axial motion thereon. When the coupling is disconnected as shown in FIGURE 1, the forward end of balanced socket sleeve 66 surrounds the forward end of socket stem 52, covering socket passages 56 and having sealing engagement with socket stem seal 63. Axially forward of its point of engagement with seal 63 as shown in FIGURE 1, socket sleeve 66 is provided with an internal groove 70 for retaining an annular seal 71; preferably a "U"-shaped FEP Teflon cover over a stainless steel garter-type spring as mentioned in connection with seals 42 and 63. Seal 71 has sealing engagement with the external cylindrical surface of end plug 58 when the coupling is disconnected as shown in FIGURE 1 and acts as the fluid seal which transfers to nipple sleeve 39 when the coupling is connected as described below.

At the same time, the axial central portion 72 of socket sleeve 66 has an enlarged internal bore whose wall is spaced away from the outside surface of socket stem 52 to provide an annular balanced pressure chamber 73 between sleeve 66 and stem 52. The rearward end of chamber 73 is terminated by the reduced internal bore of socket sleeve 66. The rearward end of socket sleeve 66 is turned onto an axially extending, externally threaded portion 74 of driving ring 67 and effectively connects socket sleeve 66 and driving ring 67 together. A sealing means 75 is retained in the joint between socket sleeve 66 and drive ring 67. For this rear socket seal 75, we prefer to employ laminated Teflon washers restrained to form a lip which is forced against the outer cylindrical surface of socket stem 52 by fluid pressure in the balanced pressure chamber 73. A radial shoulder 76 in socket body 50 lying between the base of socket stem 52 and the rearward end of barrel 51 engages driving ring 67 and limits the travel of the driving ring and socket sleeve 66 in the rearward direction.

Socket valving sleeve actuator ring 68 is mounted for axial sliding motion on the outer cylindrical surface 77 of barrel 51 and is connected to driving ring 67 by a number of driving pins 69 extending radially therebetween and passing through appropriately located slots 78 in barrel 51. Thus, axial motion of actuator ring 68 on the outside of barrel 51 produces corresponding axial motion of socket sleeve 66 and driving ring 67 along socket stem 52 and within barrel 51.

A lock pin-retaining sleeve 80 is mounted for axial motion on outer cylindrical surface 77 of barrel 51. The forward end of lock pin-retaining sleeve 80 is provided with an enlarged bore 82 terminated by an inclined annular shoulder and cooperates with a plurality of lock pins 84 carried in radial openings 85 passing through barrel 51 at circumferentially spaced intervals.

Lock pins 84 cooperate with external annular groove 27 in nipple barrel 14 to lock the coupling parts together. As shown in FIGURE 1, when the coupling is disconnected, lock pins 84 are normally retracted in their openings 85 into the internally relieved forward portion of retaining sleeve 80 and maintained there by a trigger ring 86 mounted for axial sliding motion inside barrel 51. Trigger ring 86 has a relieved forward external portion engaging the beveled radially inner ends of pins 84 and is urged forwardly in the socket by spring 87 acting between it and an internal snap ring 88. As will be described more fully below, rearward movement of trigger ring 86 in the socket releases pins 84 and permits them to be cammed inwardly and locked in their inward position by the overriding axial motion of pin-retaining sleeve 80. The particular pin-carrying openings together with their operation in connection with a trigger ring are more fully described in copending application by Rolland W. Collar, one of the joint inventors of the invention described herein, being Serial No. 167,226, filed January 16, 1962, and now abandoned.

Both the coupling mechanism and the valving assembly 65 are actuated by an outer socket collar 90 mounted for axially sliding engagement on the outer cylindrical surface of lock pin-retaining sleeve 80. Socket collar 90 is provided with an internal shoulder 91 for engagement by the forward termination of an enlarged diameter portion 89 of retaining sleeve 80 to limit relative axial motion between collar 90 and sleeve 80.

The rearward and somewhat enlarged end of socket collar 90 overlies actuator ring 68, providing an annular space therebetween in which is located a translating sleeve 93. Translating sleeve 93 is mounted for limited axial motion on the outer surface of actuator ring 68, its forward motion limited by an internal shoulder 94 within socket collar 90 and its rearward motion by an external shoulder 95 on the outer surface of actuator ring 68. Translating sleeve 93 is urged forwardly by spring 96 acting between the translating sleeve and an outwardly extending flange 97 on actuator ring 68. A snap ring 98 fitted in an internal groove at the rearward end of collar 90 is engageable by external flange 97 on actuator ring 68 and provides a unidirectional driving connection between collar 90 and socket valving assembly 65 during operation of the coupling as described more fully below.

Two series of ball locks are provided in socket assembly 11 for accomplishing some of the sequencing of operation of the various relatively axially slidable elements of the assembly.

A first series comprises a number of circumferentially spaced radial openings in the rearward portion of lock pin-retaining sleeve 80 carrying balls 101. During operation of the coupling, balls 101 are variously cammed into and captured in an internal groove 102 in collar 90 and external groove 103 in socket barrel 51. Capture of balls 101 in groove 102 as shown in FIGURE 1 requires collar 90 and retaining sleeve 80 to move axially together. Transfer of balls 101 to groove 103 by forward motion of collar 90 releases collar 90 from sleeve 80 and locks sleeve 80 to barrel 51.

A second series of ball locks comprises a number of circumferentially spaced radial openings 104 in the forward portion of valve actuator ring 68 carrying balls 105. During operation of the coupling, balls 105 are variously cammed into and captured in an internally relieved forward portion of translating sleeve 93 and an external annular groove 106 in barrel 51. Capture of balls 105 in translating sleeve 93 as shown in FIGURE 1 merely holds sleeve 93 cocked against spring 96. When valve actuator ring 68 is moved axially of socket barrel 51 during operation of the coupling, balls 105 are cammed into and captured by external annular groove 106 in barrel 51, locking actuator ring 68 to barrel 51 and socket valving assembly 65 in an open valve position as will be described more fully below.

As shown in broken outline in FIGURE 1, a dust cap 109 may be employed to cover the open end of socket assembly 11 and to provide a dust and moisture seal. Preferably, the cap is molded in one piece of resilient plastic material or the like and installed over the open end of barrel 51 by snapping it into a retaining groove 110.

Figure 2:
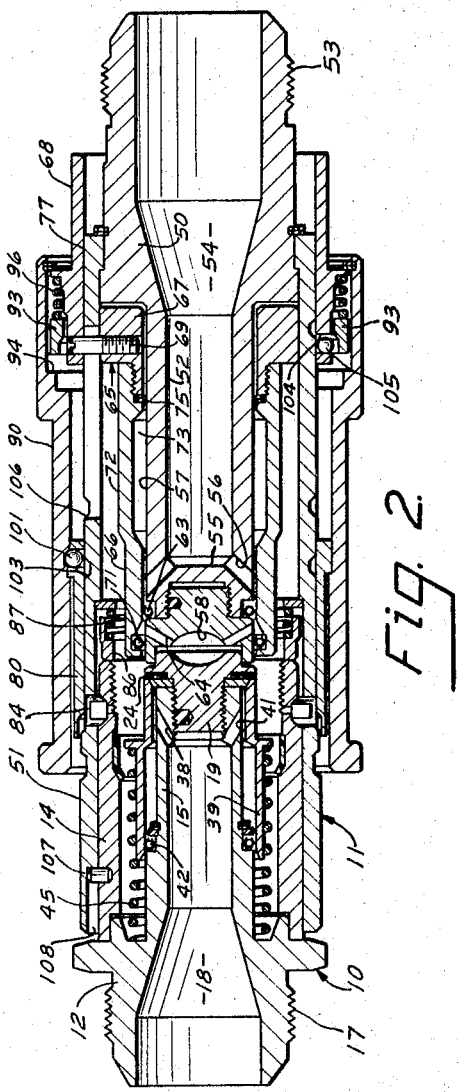
FIGURE 2 is an axial cross section of the coupling of FIGURE 1 shown at that stage of the coupling or uncoupling sequence at which the coupling parts are locked together and the valve means in each of the coupling halves are closed.

The operation of the coupling embodying our invention and as described above and its sequence is illustrated in the four figures of the drawings. FIGURE 1 shows the two coupling parts disconnected and separated from each other with the valving means in each part fully closed and sealed against fluid pressure as may be applied from conduits (not shown) connected to the coupling parts. FIGURE 2 shows the two coupling parts locked together and with the valves in each of the parts in a closed and sealed condition. FIGURE 3 illustrates that stage in the full connection operation at which the coupling parts are locked together and a fluid seal between the coupling parts is established with the valving means still closed and sealed. As shown in FIGURE 4, the coupling is fully connected, locked and sealed together with the valves in both of the coupling parts fully opened permitting fluid flow through the coupling.

In the disconnected and separated condition of the coupling parts shown in FIGURE 1, nipple sleeve 39 of nipple assembly 10 is urged to its forwardmost position of axial movement on nipple stem 15 by coil spring 45. The fluid passages through nipple assembly 10 are thereby sealed because of the sealing engagement of the forward end of nipple sleeve 39 with stem seal 24 and the sealing engagement of the rearward internal surface of nipple sleeve 39 with nipple valving sleeve seal 42. Because the effective diameters of sealing engagement of nipple sleeve 39 with stem seal 24 and with sleeve seal 42 are substantially the same, the pressure contained within nipple assembly 10 when the sleeve valve is closed has little or no tendency to urge the sleeve valve one way or the other; i.e. sleeve valve 39 is pressure balanced.

When socket assembly 11 is separated from nipple assembly 10 as shown in FIGURE 1, socket collar 90 is at a substantially fully retracted or rearward position with respect to socket body 50 with the forward end of barrel 51 extending forwardly of collar 90 and threaded nipple portion 53 of socket body 50 extending rearwardly of the collar. Lock pins 84 are retracted radially outwardly in openings 85 of barrel 51 and retained there by trigger ring 86 urged into engagement with the inner ends of the pins by spring 87. The forward end of lock pin-retaining sleeve 80 overlies the outer end and engages the rearward side of lock pins 84 and is thereby prevented from sliding axially forward on barrel 51 from the position shown in FIGURE 1. Socket collar 90 and lock pin-retaining sleeve 80 are locked together against relative axial motion by ball locks 101 in sleeve 80 cammed into groove 102 in collar 90 by the external surface of barrel 51 underlying ball openings in the sleeve. Thus, socket collar 90 is locked against forward axial motion relative to socket body 50.

Socket valving assembly 65 is in its rearwardmost position of axial travel with respect to socket body 50. Further rearward travel of valving assembly 65 is prevented by the engagement of the rearward side of socket sleeve driving ring 67 and radial shoulder 76 of socket body 50. Forward axial motion of socket valving assembly 65 is prevented by the interlocking engagement of translating sleeve 93 with socket collar 90 and valve actuator ring 68 of socket valving assembly 65. As shown in FIGURE 1, balanced sleeve 66 of socket valving assembly 65 is in a position overlying and closing fluid passages 56 and in sealing engagement with stem seal 63 and sleeve seal 75. Since the effective diameters of sealing engagement of balanced sleeve 66 with stem seal 63 and sleeve seal 75 are substantially the same, the pressure contained within socket assembly 11 when balance sleeve 66 is closed has little or no tendency to urge the balance sleeve one way or the other; i.e., balance sleeve 66 is pressure balanced.

Connection of the coupling parts is initiated by grasping socket collar 90 and engaging socket assembly 11 and nipple assembly 10. Socket 11 is pushed forward by means of socket collar 90 axially onto nipple 10. When the forward end of nipple barrel 14 engages trigger ring 86, further forward axial motion displaces the trigger ring from under lock pins 84. The inner ends of lock pins 84 are transferred onto the forward external surface of nipple barrel 14 until opposite lock pin receiving groove 27 in the barrel. At this point, lock pins 84 are free to move radially inwardly of the coupling into pin-receiving groove 27. Further forward axial motion of socket collar 90 and lock pin-retaining sleeve 80 locked thereto by lock balls 101 positively cams all of lock pins 84 into groove 27 of the nipple. The outer ends of lock pins 84 are now flush with the external surface of socket barrel 51, permitting lock pin-retaining sleeve 80 to override and positively lock them in the pin-receiving groove of the nipple. At this point in the connecting operation, the coupling is as shown in FIGURE 2 with the nipple and socket assemblies positively locked together and with the valving means in each of the coupling parts as yet undisturbed from their uncoupled position. It will be noted that internal snap ring 98 in the rearward end of collar 90 is in engagement with external flange 97 of valve actuator ring 68 so that further forward axial motion of socket collar 90 from the position shown in FIGURE 2 will drive the socket valving assembly 65 forward.

As the forward motion of socket collar 90 is continued from the FIGURE 2 position, socket valving assembly 65 is carried forward, sliding balanced sleeve 66 forwardly on and beyond the end of socket stem 52 and onto the external surface of the forward portion of nipple sleeve 39. When socket seal 71 in the forward end of sleeve 66 has been transferred onto and in sealing engagement with nipple sleeve 39, the fluid seal between the two coupling parts is complete. The completion of this fluid seal as shown in FIGURE 3 is accomplished before socket pressure is released by operation of the valving means in both the nipple and socket coupling parts. As shown in FIGURE 3, the nipple sleeve 39 remains in its disconnected position and while balanced sleeve 66 has been moved axially forward, sealing engagement is maintained between it and socket stem seal 63.

At the same time that socket valving assembly 65 is being moved forward by the further forward axial movement of socket collar 90, lock pin-retaining sleeve 80 is positively locked to socket barrel 51 in its lock pin-retaining position by the camming and capturing of lock balls 101 in groove 103 in the socket barrel. Upon the engagement of lock balls 101 in groove 103, lock pin-retaining sleeve 80 is prevented from any further forward axial motion and is unlocked from connection with socket collar 90.

Forward axial movement of socket collar 90 from the position shown in FIGURE 3 opens fluid passages 56 in socket stem 52 as the annular pressure balanced chamber in socket sleeve 66 is brought radially opposite socket stem seal 63. At this point, the coupling is not yet open to fluid flow and pressure in socket assembly 11 is sealed by means of fluid seal 71 in sleeve 66 having sealing engagement with the exterior surface of nipple sleeve 39 and by sealing means 75 at the rearward end of socket sleeve 66 having sealing engagement with socket stem 52.

Continued forward axial motion of socket collar 90 drives socket valving assembly 65 forward, bringing the forwardmost end of balanced sleeve 66 into engagement with flange 46 of nipple sleeve 39. Forward motion of socket collar 90 subsequent to the engagement between the two balanced sleeves drives nipple sleeve 39 rearwardly, unseating the forward end of nipple sleeve 39 from stem seal 24 and opening fluid passages 38 in the nipple. Axial movement of socket collar 90 in the forward direction with respect to socket assembly 11 is limited at the position shown in FIGURE 4 by the capture of lock balls 105 in groove 106 of socket barrel 51 by limited forward motion of spring-biased translating sleeve 93. Translating sleeve 93 is limited in its forward motion to a position overlying and restraining lock balls 105 in groove 106 by engagement with internal shoulder 94 in socket collar 90.

As shown in FIGURE 4 and as a result of the sequence of operations described above, nipple assembly 10 and socket assembly 11 are in a fully locked-together condition with the valves in both coupling parts locked in a fully open position. It is important to note that the entire connection operation is accomplished solely by a straight axial movement of socket collar 90 toward the nipple. Further, the sequence of operations is such as to eliminate the hazard of the two coupling parts being blown apart upon the release of pressure in one or the other or both of them because they are positively locked together prior to the opening of either or both of the valving means. Furthermore, a fluid seal between the two coupling parts is established in the sequence of operations prior to the opening of the valving means in either of the coupling parts, thereby preventing the leakage of any fluid during the coupling operation.

The disconnecting operation is also accomplished by a single straight axial movement of socket collar 90 away from nipple assembly 10 or in a rearward direction with respect to socket assembly 11. Beginning with the coupling in its fully locked and open condition shown in FIGURE 4, pulling on socket collar 90 first pushes translating sleeve 93 against its spring load, unlocking ball lock 105 in socket valving assembly 65. When translating sleeve spring 96 is fully compressed, socket valving assembly 65 and nipple sleeve 39 move together until the forward end of nipple sleeve 39 engages nipple stem seal 24. Then, the forward balanced socket sleeve seal 71 begins to slide off balance nipple sleeve 39; but, prior to disengagement of socket sleeve seal 71 from nipple sleeve 39, socket sleeve 66, rearwardly of its forward seal 71, engages socket stem seal 63. At this point, there remains trapped pressure between the two coupling parts. As the forward sleeve seal 71 leaves the nipple part and crosses the gap between the two coupling parts, this pressure is bled off to atmosphere through protective bleed passages 64 in socket end plug 58.

Protective bleed passages 64 provide a further safeguard against failure of seal 71. For example, if socket stem seal 63 is defective, a substantial differential pressure will exist across seal 71 during the uncoupling operation if protective bleed passages 64 are not provided. The differential pressure would force seal 71 out of its groove 70, jamming the assembly and necessitating the shearing of the seal by application of considerable force or require bleeding down the entire system involving the coupling in order to disconnect it. Protective bleed passages 64 eliminate such a potential hazard and greatly increase the coupling's reliability. The sequencing of the seal transfer in uncoupling as well as in coupling is designed to be accomplished without differential pressure across the seals in cases where such pressure could cause seal blowout.

Once forward sleeve seal 71 has transferred to socket stem 52, the fluid pressure within socket assembly 11 is sealed and contained and the fluid seal with nipple assembly 10 broken. Further rearward movement of socket collar 90 returns socket valving assembly 65 toward its disconnected position shown in FIGURE 1 and simultaneously unlocks lock pin-retaining sleeve 80 from barrel 51. As lock balls 101 in lock pin-retaining sleeve 80 are transferred from groove 103 in socket barrel 51 to groove 102 in socket collar 90, lock pin-retaining sleeve 80 is freed for rearward axial movement with socket collar 90. Such movement unlocks lock pins 84, permitting them to be cammed radially outwardly by the forward inclined side wall 29 of lock pin-receiving groove 27 in nipple barrel 14. As socket assembly 11 is moved off of and out of engagement with nipple assembly 10, the inward end of lock pins 84 is transferred to trigger ring 86 urged into position by its biasing spring 87.

On completion of the disconnecting operation, the two coupling parts are returned to their position as shown in FIGURE 1. The valving means within each of the parts is closed and sealed against fluid pressure therein and the means for locking the two coupling parts together is cocked and ready to be reconnected.

As shown in the drawings, the coupling is provided with means for insuring the use of the proper socket or sockets with a particular nipple and vice versa. This is accomplished by indexing pins 107 extending radially outwardly from nipple barrel 14 which mate with axial internal grooves 108 opening onto the forward end of socket barrel 51. The nipple half has two or more indexing pins which can be spaced at varying points about the periphery of the nipple barrel depending upon the number of polarizing combinations required. The socket half of the coupling intended to be used with a particular nipple half is then provided with appropriately located grooves for mating engagement with the indexing pins. In this way, if assembly is attempted of the improper coupling part, the pins will prevent engagement before the valve surfaces can engage and/or before trigger ring 86 can be actuated to release locking pins 84.

Those skilled in the art will appreciate that various changes and modifications can be made in the apparatus described herein without departing from the spirit and scope of the invention.

We claim:
1. A quick connect valved coupling comprising
a nipple body and a socket body which telescope together and which each have a coaxial hollow stem closed at its forward end, said stems having generally radial passages extending from their interior to their exterior and being aixally aligned with their closed forward ends juxtaposed and adjacent when said coupling bodies are telescoped together,
locking means carried in said socket for engaging said nipple body and locking the coupling together when said nipple and socket bodies are telescoped together.
an annular external forward stem seal on each of said stems forward of said generally radial passages therein,
an annular external rearward stem seal on said nipple stem rearward of said generally radial passages therein,
a nipple valving sleeve on and axially slidable along said nipple stem and having its rearward portion slidingly and sealingly engaging said rearward nipple stem seal in all positions and resilient means biasing said nipple valving sleeve forwardly into a closed position and into sealing engagement with said forward nipple stem seal,
a socket valving sleeve on and axially slidable along said socket stem and having end portions and an enlarged bore portion intermediate its end portions and internal annular forward and rearward socket sleeve seals in its end portions forwardly and rearwardly of said enlarged bore portion, respectively, and which slidingly and sealingly engage the exterior of said socket stem forwardly and rearwardly respectively of said generally radial fluid passages therein,
said socket valving sleeve being movable forwardly from a closed rearward position on said socket stem to a first forward position of telescoping sealing engagement of said forward socket valving sleeve seal and the exterior of said nipple valving sleeve for establishing a fluid seal between said coupling parts while maintaining a closed condition of said valves in both coupling parts,
said socket valving sleeve being movable forwardly to a second and further forward position with said enlarged bore portion of said socket valving sleeve radially opposite and spaced from sealing engagement with said forward socket stem seal and with the forward portion of said socket valving sleeve in telescoping and abutting sealing relationship with said nipple valving sleeve while maintaining said nipple valving sleeve closed,
said socket valving sleeve being movable forwardly to a third position to effect opening of said socket valving sleeve while moving said nipple valving sleeve rearwardly to an open position thereby establishing a continuous fluid passage through the coupling and while maintaining said fluid seal between the nipple and the socket,
a protective bleed orifice and vent in the forward end of said socket stem and extending between the exterior surface of said socket stem forwardly of said forward socket stem seal and said forward closed end of said socket stem for bleeding off and venting and relieving deleterious pressure on said forward socket sleeve seal during its transfer between said nipple valving sleeve and stem and said socket stem,
an external collar on said socket body axially slidable thereon from a rearward coupling unlocking and valve closing position to a forward coupling locking and valve opening position, said collar having cooperative engagement with said locking means and said socket valving sleeve whereby axial movement of said collar when said coupling bodies are telescoped together successively actuates said locking means to lock the coupling together and then moves said socket valving sleeve from its rearward to its forwardmost position.

2. A quick connect coupling according to claim 1 in which said nipple stem seal and said nipple valving sleeve seal have substantially the same diameters of sealing engagement with said nipple valving sleeve and said nipple stem, respectively.

3. A quick connect coupling according to claim 1 in which said forward and rearward internal socket valving sleeve seals and said socket stem seal have substantially the same diameters of sealing engagement with said nipple valving sleeve, said socket stem and said socket valving sleeve, respectively.

4. A quick connect coupling according to claim 3 in which said nipple stem seal and said nipple valving sleeve seal have substantially the same diameters of sealing engagement with said nipple valving sleeve and said nipple stem, respectively.

5. A quick connect coupling according to claim 1 in which movement of said socket collar from its forwardmost to its rearwardmost position when said coupling is fully connected and open operates to close and disconnect the coupling through connection with said socket sleeve through a sequence of operations which is the reverse of the connecting sequence of operations.

References Cited by the Examiner

UNITED STATES PATENTS

| | | | |
|---|---|---|---|
| 2,553,680 | 5/1951 | Scheiwer | 137—596 |
| 2,637,572 | 5/1953 | Bruce | 137—614.02 |
| 2,678,834 | 5/1954 | Courtot | 137—614.02 |
| 2,837,352 | 6/1958 | Wurzburger | 137—614.03 X |
| 3,039,794 | 6/1962 | De Cenzo | 285—316 X |
| 3,113,588 | 12/1963 | Torres | 137—614.06 |
| 3,123,099 | 3/1964 | Breuning et al. | 137—614.06 |

FOREIGN PATENTS

| | | |
|---|---|---|
| 973,825 | 7/1960 | Great Britain. |

WILLIAM F. O'DEA, *Primary Examiner.*

ISADOR WEIL, *Examiner.*

D. MATTHEWS, *Assistant Examiner.*